United States Patent
Witengier et al.

(10) Patent No.: US 9,776,122 B2
(45) Date of Patent: Oct. 3, 2017

(54) HIGH PRESSURE COMPRESSED AIR/GAS/STEAM FILTER

(71) Applicants: Julian L Witengier, Manchester, MO (US); Todd M Witengier, Chesterfield, MO (US)

(72) Inventors: Julian L Witengier, Manchester, MO (US); Todd M Witengier, Chesterfield, MO (US)

( * ) Notice: Subject to any disclaimer, the term of this patent is extended or adjusted under 35 U.S.C. 154(b) by 82 days.

(21) Appl. No.: 14/756,919

(22) Filed: Oct. 30, 2015

(65) Prior Publication Data

US 2016/0121253 A1    May 5, 2016

Related U.S. Application Data

(60) Provisional application No. 62/122,780, filed on Oct. 29, 2014.

(51) Int. Cl.
| | |
|---|---|
| *B01D 46/24* | (2006.01) |
| *B01D 46/42* | (2006.01) |
| *B01D 46/00* | (2006.01) |

(52) U.S. Cl.
CPC ..... *B01D 46/2403* (2013.01); *B01D 46/0005* (2013.01); *B01D 46/24* (2013.01); *B01D 46/4227* (2013.01)

(58) Field of Classification Search
CPC  B01D 46/0005; B01D 46/24; B01D 46/2403; B01D 46/2411; B01D 46/4227
See application file for complete search history.

(56) References Cited

U.S. PATENT DOCUMENTS

| | | | |
|---|---|---|---|
| 270,807 A | 1/1883 | Johnson | |
| 768,951 A | 8/1904 | Rawson | |
| 999,759 A | 8/1911 | Dondey et al. | |
| 2,352,269 A * | 6/1944 | Kraissl, Jr. ........... | B01D 35/005 |
| | | | 210/452 |
| 2,583,423 A | 1/1952 | Hallinan | |
| 2,692,684 A | 10/1954 | Hallinan | |
| 2,903,861 A * | 9/1959 | Alcus ................... | B01D 53/265 |
| | | | 55/434.3 |
| 2,955,712 A | 10/1960 | Gutkowski | |
| 2,978,107 A | 4/1961 | Gutkowski et al. | |
| 3,248,183 A | 4/1966 | Powell et al. | |
| 3,283,098 A | 11/1966 | Bair et al. | |
| 3,295,684 A | 1/1967 | Webb | |

(Continued)

*Primary Examiner* — Robert Clemente
(74) *Attorney, Agent, or Firm* — Paul M. Denk

(57) ABSTRACT

A high pressure compressed air/gas/steam filter, incorporating a heavy main housing body, flanges that are rigidly secured to the top and bottom of the housing body, the housing body having an inlet, an outlet port, and a central cavity into which the operating filter cartridge element locates. A manifold cage assembly, incorporating a variety of seals, secures with a manifold plate, that likewise connects through the use of tie-rod the filter element in place, for high pressure filtration. Once the top flange is removed, the integrated manifold cage, its manifold plate, and its secured filter, can simply be upwardly removed with bolts or fasteners from the main body housing, the filter element cleansed, or replaced and only these removed components can then be reinserted back into the heavy filter housing body, for retightening of its upper flange in place, readying the high pressure filter for further application.

7 Claims, 3 Drawing Sheets

(56) References Cited

U.S. PATENT DOCUMENTS

| | | | |
|---|---|---|---|
| 3,438,498 A | 4/1969 | Rosaen | |
| 3,490,205 A | 1/1970 | Hauser | |
| 3,508,657 A | 4/1970 | Cooper | |
| 5,080,787 A | 1/1992 | Brown et al. | |
| 5,082,561 A | 1/1992 | LaPierre | |
| 6,023,834 A | 2/2000 | Brown et al. | |
| 6,136,076 A * | 10/2000 | Read | B01D 46/0005 55/480 |
| 6,485,535 B1 * | 11/2002 | Linnersten | B01D 46/0004 55/319 |
| 6,615,989 B2 | 9/2003 | Brown et al. | |
| 6,843,378 B1 | 1/2005 | Kiderman et al. | |
| 7,098,301 B1 | 8/2006 | Smith | |
| 7,883,559 B2 * | 2/2011 | Herges | B01D 45/12 55/315 |
| 2007/0084785 A1 * | 4/2007 | Schuster | B01D 45/18 210/435 |
| 2010/0147153 A1 * | 6/2010 | Patel | B01D 46/0005 96/190 |
| 2011/0056381 A1 * | 3/2011 | Azwell | B01D 46/2403 96/297 |
| 2011/0315018 A1 * | 12/2011 | Moens | B01D 46/0004 96/400 |

* cited by examiner

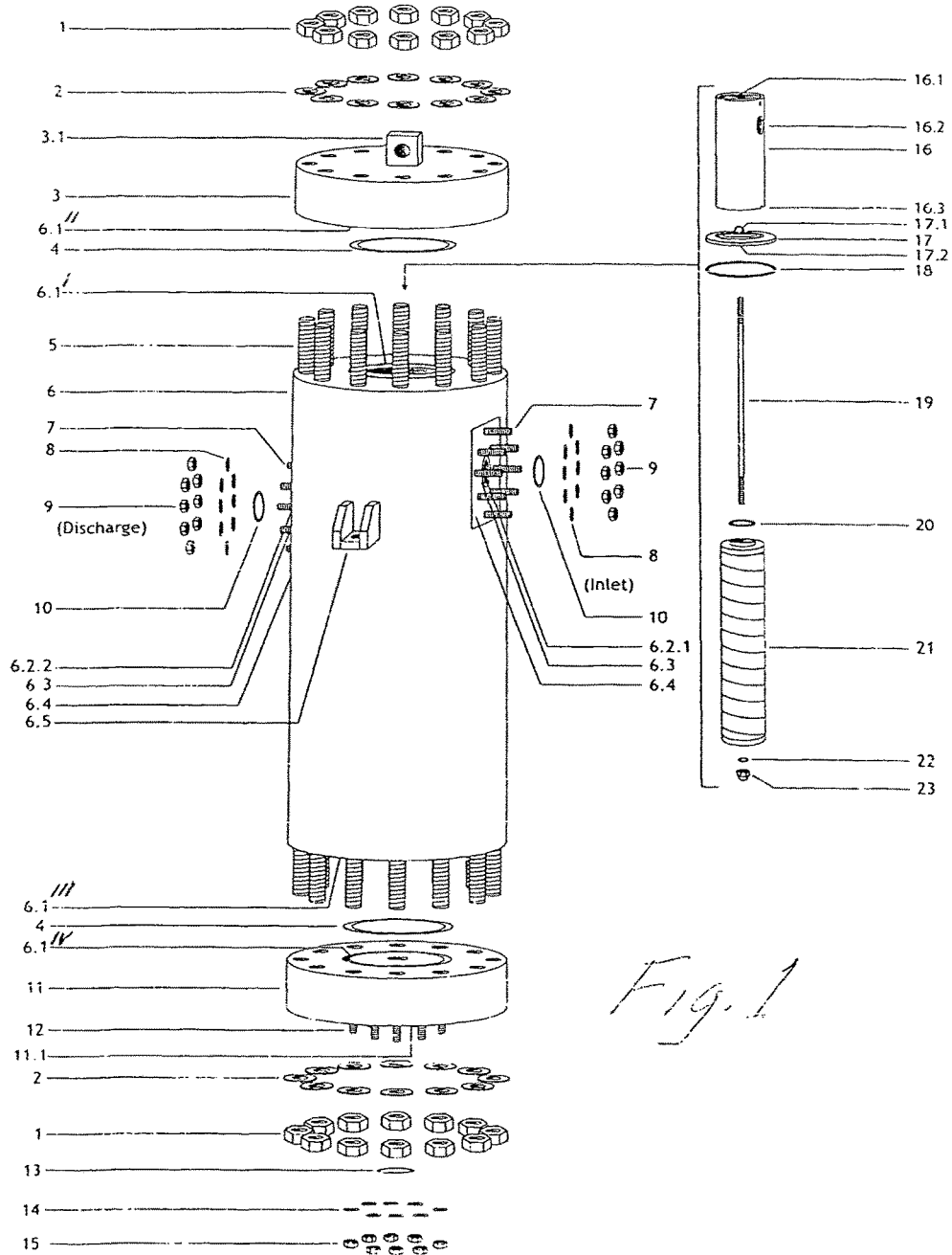

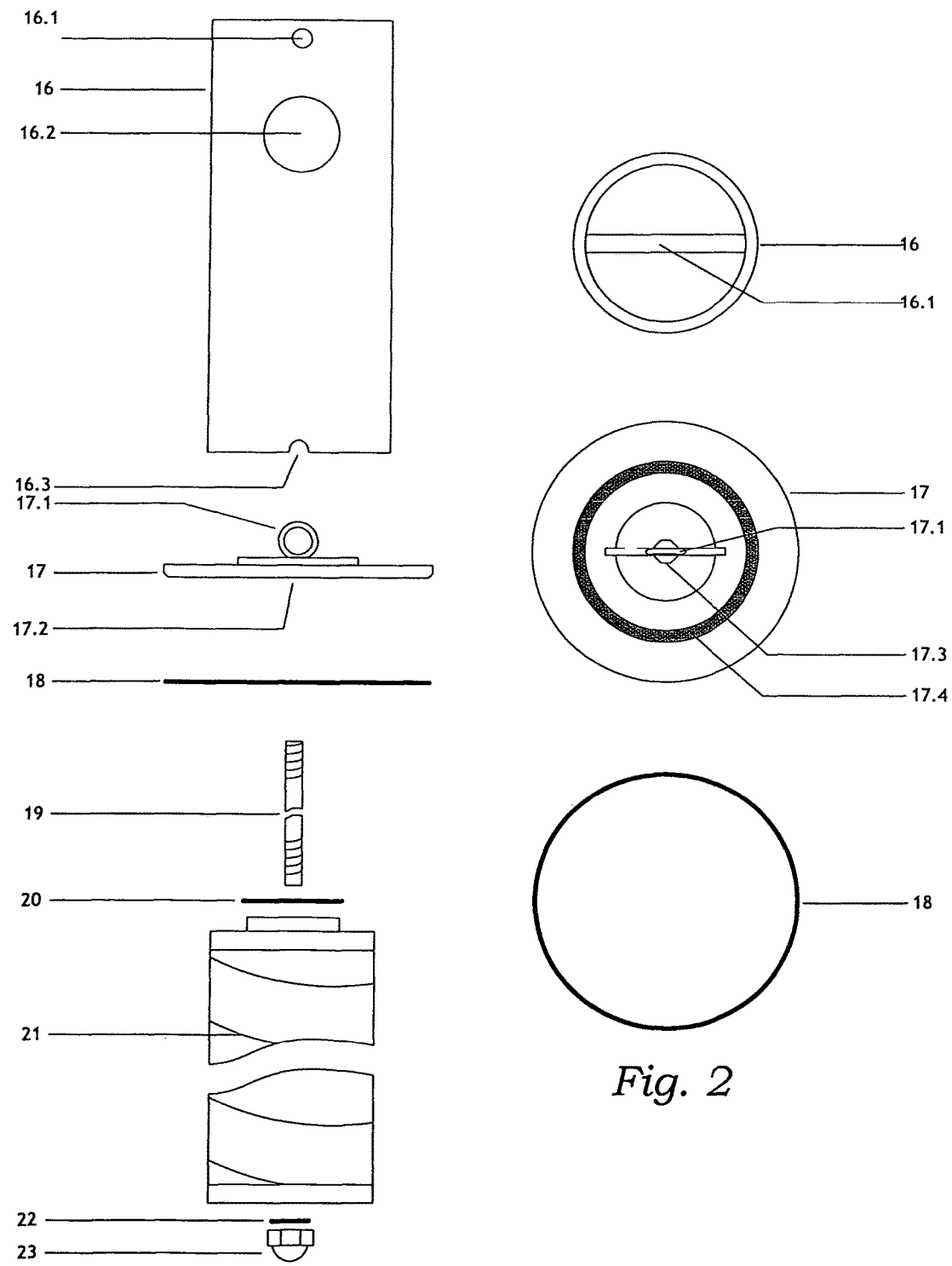

HIGH PRESSURE COMPRESSED AIR/GAS/STEAM FILTER

CROSS REFERENCE TO RELATED APPLICATION

This non-provisional patent application claims priority to the provisional patent application having Ser. No. 62/122,780, filed on Oct. 29, 2014.

FIELD OF THE INVENTION

This invention relates to a high pressure compressed air/gas/steam filter, whose integrated components can be easily disassembled and replaced, when necessary, to maintain the high efficiency operation of the filter during usage.

BACKGROUND OF THE INVENTION

The concept of this invention relates in general to filtration of gas and/or steam in a high pressure operating condition, in particular to an assembly vessel capable of withstanding the high pressures of the treated gas or air, while allowing the removal of particulates, solids, liquids, and/or oil, or other deleterious particles, from a gas flow.

More specifically, and without restriction to the particular use as shown and described, this invention relates to an improved high pressure filter housing assembly to subject a gas to filter, coalescing, and separation to remove solids, emulsify liquids, and/or oils therefrom.

As its well known in the art, and in numerous situations, a continuous liquid or gas phase is subject to the accumulation of contaminants in the form of solid particles, liquids, and/or gases, in addition to other extraneous or foreign particles, which must be subjected to filtration and separation, and such filtration devices have been attempted by numerous techniques, and have been available in the prior art. The contaminating material, may for example, be present as a solid, a liquid, or even a gas within a gas media, or within a combination of such, as steam, has long been treated and filtered in the art. Foreign matter is prevalent, for example, in pneumatic lines used in conjunction with air/gas compression systems, as for enhanced oil recovery injection systems, power generation, and the like.

Many devices, in the form of filters, in the prior art have relied upon conventional housing designs, which require removal of the housing "bowl" for access to the filter element cartridge, to attain its removal therefrom. Such filters need to be cleaned, replaced, as can be understood, and particularly in high pressure applications, the filter housings are necessarily large and extremely heavy, requiring specialized equipment to lift, manipulate, and completely remove the filter housing assembly from the compressed air line and/or skid in order to gain access to the filter element cartridge, for its exchange after its useful service life has become depleted. Such a design paradigm is cumbersome, time consuming, and potentially dangerous, because of the heavy weight, and the bulk and size of the equipment embodied in the filter, or the equipment which is used to remove the same, particularly when routine maintenance operations of the high pressure filter itself is required.

By incorporated a top-loaded removable manifold, to gain access to the filter element cartridge, as with the current design, routine maintenance operations addressing filter cartridge exchange are simplified by the ability to leave the filter housing in-situ during the exchange. Access to the removable manifold is made possible by only removing the top blind flange from the main body of the heavy housing. No bowl removal is required to gain access to the filter element cartridge itself, for further processing.

Examples of prior art types of high pressure filters can be seen in various existing patents. There are many patents that show various types of high pressure filters, such as can be seen in the United States Patent to Webb, U.S. Pat. No. 3,295,684, but showing a different type of filter arrangement from that of the current invention.

The early patent to Dondey, et al, U.S. Pat. No. 999,759 shows an early high pressure filter.

The patent Kiderman, et al, U.S. Pat. No. 6,843,378, shows another filter unit with high pressure filter cap.

The patent to Rawson, U.S. Pat. No. 768,951, shows another high pressure filter.

The patent to Johnson, U.S. Pat. No. 270,807, shows another high pressure filter press.

The patent to Powell, et al, U.S. Pat. No. 3,248,183, shows a high pressure high temperature type of filter.

The patent to Bair, et al, U.S. Pat. No. 3,283,098, shows a high pressure filter having a relief valve in its base.

The patent to Brown, et al, U.S. Pat. No. 6,615,989, discloses a method of assembling of improved bead-lock high pressure filter, utilizing a stamped metal cover and filter obtained thereby.

The patent to La Pierre, U.S. Pat. No. 5,082,561, shows another high pressure filter supports for liquids, systems therewith and methods of use.

Another patent to Brown, et al, U.S. Pat. No. 6,023,834, shows another high pressure filter.

The patent to Hallinan, U.S. Pat. No. 2,692,684, shows a further high pressure filter.

The patent to Rosaen, U.S. Pat. No. 3,438,498, shows another high pressure filter device.

The patent to Brown, et al, U.S. Pat. No. 5,080,787, shows an apparatus for forming high pressure filters.

The patent to Steiner, U.S. Pat. No. 7,332,010, shows a high pressure filter/separator and locking mechanism.

The patent to Smith, U.S. Pat. No. 7,098,301, shows a high pressure filter method of separating polymer solids and unreacted monomer.

The patent to Cooper, U.S. Pat. No. 3,508,657, discloses a high pressure filter assembly having an easily detachable bowl cover.

The patent to Hallinan, U.S. Pat. No. 2,583,423, shows a high pressure filter.

The patent to Brown, et al, U.S. Pat. No. 6,023,834, shows a method for assembling an improved bead-block high-pressure filter utilizing a stamped metal cover.

The patent to Hauser, U.S. Pat. No. 3,490,205, discloses a high pressure gas filter system.

The patent to Gutkowski, U.S. Pat. No. 2,955,712, shows a high pressure oil filter unit incorporating a threaded bowl assembly valve actuating means.

Finally, another patent to Gutkowski, et al, U.S. Pat. No. 2,978,107, shows a high pressure oil filter unit having combined automatic shut-off and relief valve structure.

The foregoing shows some early and more contemporary filters for processing gas, and their structures and methods of operation. All of these shown filter units are of a very heavy design, and therefore are difficult to service as when replacing or cleaning their filters.

SUMMARY OF THE INVENTION

This invention upon a high pressure filter is designed just for that purpose, for use for operation at relatively high pressures, for filtering the gas, air, steam, passing therethrough, so that the filter housing with its excessive weight can really be left in tact, and only an upper flange need be removed, for obtaining access to the filter element itself, for replacement or cleaning. Hence, the need to use any heavy equipment, for cleaning of the entire filter, is eliminated, and reduced to a more simplified function that can be handled by a worker or two, during servicing of the overall filter mechanism.

This invention relates to pre-filtration, coalescing, sterile, or steam filter element cartridge for use with a high pressure compressed air/gas/steam filter housing to clean the compressed media for a specified industrial application. The high pressure filter housing includes a removable manifold assembly to which the filter element cartridge is secured. The removable manifold assembly is top-loaded into the high pressure filter housing requiring only removal of the top closure flange for access. Top-loading the removable manifold/cartridge is held in place without bolts and is held securely with the top main flange and assembly eliminates the need to remove the high pressure housing from the operating line in order to remove the bottom bowl to gain access to the filter element cartridge itself, as is normally required in the prior art. The high pressure housing incorporated inlet, discharge, and drain flange connections machined directly into the structured housing wall and bottom flange, thus eliminating the necessity for the welded flange connections, as in the prior art.

The filter housing assembly is provided to allow for a filter element to be installed to clean air, gas, or steam in a high pressure operating environment. The housing is comprised of three functional components designed to withstand the high pressure conditions of the application in which it is adapted. The main housing body allows for insertion of the removable filter element and its corresponding manifold cage assembly. These are of much lesser weight than the overall housing itself, which is constructed of heavy metal, in order to sustain and hold up under exposure to the high pressure gas being treated by the filter. For example, in some instances, the pressure of the gas passing through this type of filter can exceed a high pressure in the range of 10,000 psi, or even above. The top and bottom blind flanges complete and seal the filter unit for that gaseous pressure to be applied. The bottom flange allows for attachment of a drain piping. On opposite sides of the unit are built in flange connections for the attachment of inlet and discharged lines, for the treated gas. The inlet/discharge flange connections are positioned for air/gas/steam flow through the installed filter cartridge. The high pressure filter design incorporates integrated, no-weld inlets/discharge flange connections. Only surface welds/no seam welds/are present on the housing.

The manifold cage assembly itself, and its attached filter element, is designed to be removed through the top of the main body housing for simplified filter element exchange, allowing the filter housing and assembly to remain in-situ during routine maintenance operations. These filter elements are of lesser weight than the housing. All that need be done is to remove the top flange and manifold cage assembly, in order to attain access to the filter for cleaning or replacement. Additionally, the removable manifold is held in place during operation and sealed by the incorporated manifold cage, which compresses the manifold against its sealing o-ring in the filter housing when the top blind flange is installed. In addition to securing the manifold in place, the manifold cage is also designed to allow flow from the inlet through the filter element, and thence within the housing for access to its discharge port, of the cleansed gas.

It is, therefore, the principal object of this invention to provide a high pressure filter that can be easily serviced, without encountering or requiring removal of any heavy components of the filter apparatus or housing, while performing such.

Still another object of this invention is to provide a simplified manner in which only an upper or blind flange need be removed, to attain access to the lesser weight manifold cage and its attached filter element for removal and servicing.

Another object of this invention is to provide a heavy duty filter housing assembly that can process high pressure gas, in a range of 10,000 psi, only through the removal of select lighter weight components, such as its manifold cage and filter element unit during servicing.

Another object of this invention is to provide a filter housing apparatus, of a substantially thick walled metal structure, which may weigh as much as 2500 pounds or greater, that need not be moved or even manipulated during a filter cleaning operation.

These and other objects may be come more apparent to those skilled in the art upon review of the summary of the invention as provided herein, and upon undertaking a study of the description of its preferred embodiment, in view of the drawings.

BRIEF DESCRIPTION OF THE DRAWINGS

In referring to the drawings,

FIG. 1 provides an exploded view of the various components that make up the high pressure compressed gas filter of this invention;

FIG. 2 is a top view of the filter manifold cage, its manifold plate, and the o-ring that is used to seal these components together;

FIG. 3 is an exploded side view of the various components that make up the high pressure filter element of this invention.

DESCRIPTION OF THE PREFERRED EMBODIMENT

Figure 4:
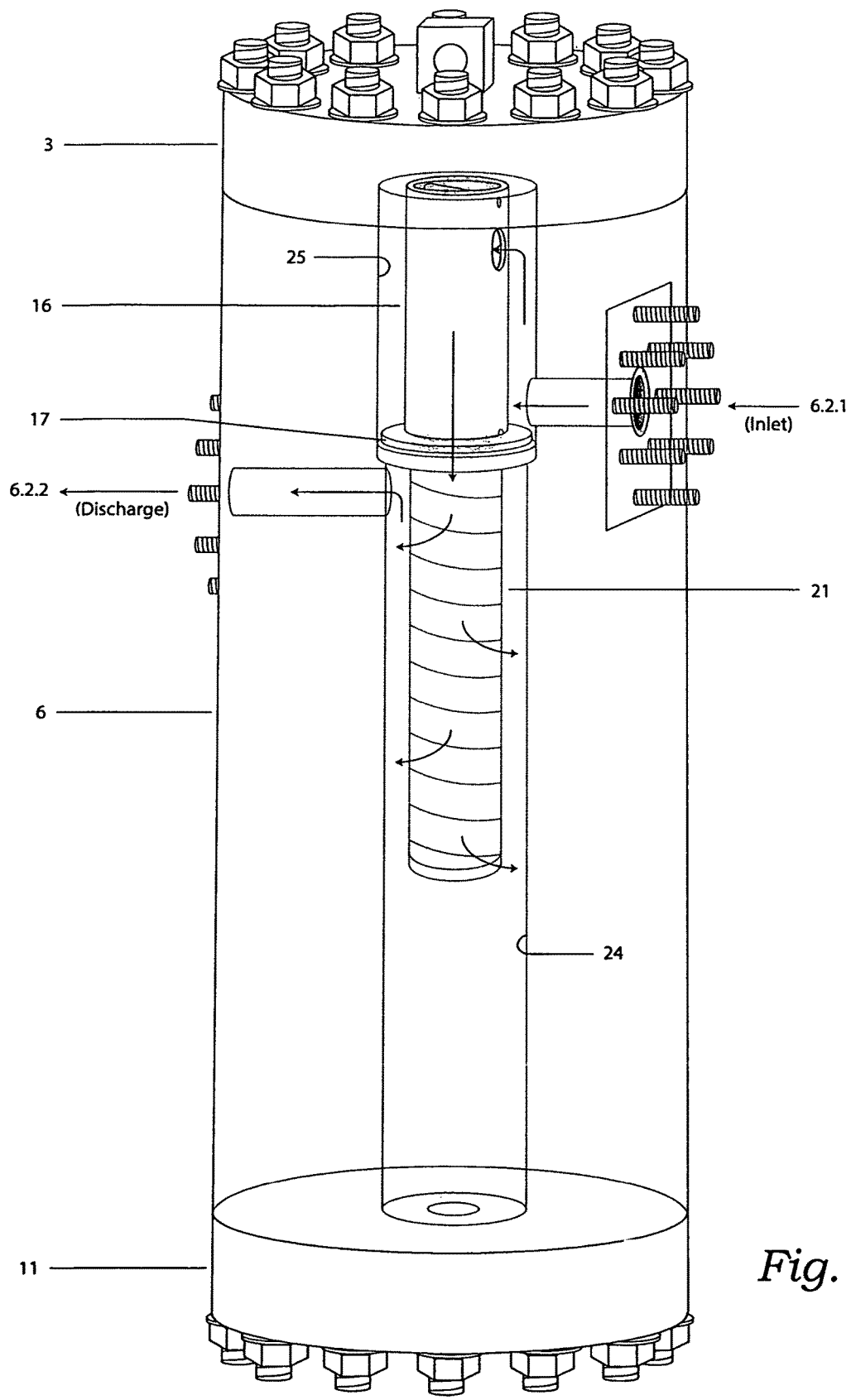
FIG. 4 is a partial sectional view of the entire filter, showing the located manifold cage assembly, its supported filter element, arranged within its heavy structural housing, which is sealed at its upper and bottom ends by its top and bottom blind flanges, and showing its high pressure air/gas flow apparatus.

In the following description of this invention, and its various component parts, this disclosure illustrates the invention by way of example and not by way of limitation. This description will clearly enable one skilled in the art to make and use the invention, and describes several adaptations, variations, alternatives and uses of the invention, including what is presently believed to be the best mode of carrying out the invention, its use, and particularly the servicing of the high pressure filter, of this invention.

In referring to FIG. 1, the filter cartridge element 21 is held in position within the main body housing 6 of the manifold assembly, and the items 16, 17, 18, 19, 20, 22, and 23, make up the various components that support the filter during its installation, and usage. The filter cartridge element 21 is secured to the removable manifold plate 17, and is held in place by the disclosed tie-rod 19, and the fastener, such as an acorn nut or other fastener 23, as noted. The manifold plate has a lifting ring 17.1, welded to its surface to allow for removal of the manifold plate 17 when installed in the main body housing 6 of the filter assembly. The filter cartridge inlet at its top end is sealed with an o-ring 20, as can be noted. The area of the filter cartridge element bottom endcap through which the securing tie-rod 19 extends, is sealed with its o-ring 22, as shown. The tie-rod, at its upper end secures to a nut provided underneath the lifting ring 17.1.

As a complete assembly, the manifold with is attached filter cartridge element is placed within the main body housing 6, of the filter assembly. It rest on a machined shelf within the main body housing 6. The sealing surface between the shelf and the main body housing 6, and the manifold plate 17, is also sealed with an o-ring 18. The manifold assembly is firmly held in place against the manifold sealing o-ring 18 by the cylindrical manifold cage 16, whose walls feature the aperture 16.2 to allow for the air/gas flow into the manifold, the drain hole 16.3 at the base to allow condensate to flow out of manifold cage and into the filter cartridge 21, as well as a lifting bar 16.1, located at the top, for ease of placement and removal of the manifold cage 16, as during servicing. In turn, the cylindrical manifold cage 15 is held into place within the completed assembly by the top housing blind flange 3, as noted. During its assembly, the top housing blind flange compresses the sealing o-ring 18 between the manifold plate 17 and the machined shelf 6.1$^I$ of the main body housing 6, when assembled. The top blind flange 3 has a lifting lug 3.1 welded to its surface to allow it to be lowered onto the main body housing 6 using lifting equipment. Sandwiched between the top blind flange 3 and the main body housing 6 is a ring-joint seal 4, to ensure against leaks when high pressure is applied. The ring-joint seal is set within the ring joint grooves 6.1$^{II}$, as previously explained, and the top blind flange 3. The top blind flange 3 is secured in place by the studs 5 that extends upwardly and are threaded into the main body housing 6 of the filter, and extend through the top blind flange 3, as well as having retaining washers 2, and the nuts 1, that are torqued using the appropriate specifications and patterns, and tooling to provide for a tight seal of the flange 3 in place.

The filter housing which has substantial weight, as aforesaid, and is preferably made of stainless or other steel, is made complete and ready for use by securing the bottom housing blind flange 11 to the main body housing 6, in similar fashion. Sandwiched between the bottom housing blind flange 11 and the main body housing 6 is a ring-joint seal 4, which is compressed into the ring-joint grooves 6.1$^{III}$ that is machined directly into the bottom of the main housing body 6, and also into the bottom blind flange 11, as can be noted, at 6.1$^{IV}$, which are sealed by securing the bottom housing blind flange 11 using the shown washers 2 and the fasteners 1 with the same torque and torquing equipment as used for securing the top housing blind flange 3 in place.

Unique to this design, the inlet and discharge flanges are machined directly into the main body housing 6 wall, 6.4, rather than welded to the main body housing 6 wall surface. Likewise, the groove 6.3 for the ring-joint seal 10 is also machined directly into the main body housing 6 wall for both the inlet 6.2.1 and the discharge ports 6.2.2. As can be seen, for both the inlet and outlet, appropriate studs 7 are threaded directly into the main body housing 6 for securing inlet and discharge connection flanges to the main body housing 6. Inlet and discharge pipes are connected to the assembled filter assembly using a ring-joint seal 10 to seal the connection joints, washers 8, and the nuts 9, with the appropriate torque and torquing pattern for their secured configuration.

The unit is configured for a drain pipe connection integrally to the bottom housing blind flange 11. The studs 12 for this connection are threaded directly into the bottom housing blind flange 11. The drain pipe is sealed using a ring-joint seal 13, which is set in the machined ring-joint seal groove 11.1, formed of the bottom flange 11, and the drain pipe flange being attached to the unit. The drain pipe (not shown) is secured into place, compressing the ring sealed joint 13, using the washers 14, and fasteners 15, with the appropriate torque and torquing pattern for its configuration.

FIG. 2 shows a top plan view of various of the filter assembly components, such as the top view of the manifold cages assembly 16, a top view of the manifold plate 17, in addition to its sealing o-ring 18.

FIG. 3 provides a side view of these various components in an exploded fashion, of slightly larger size, than that as shown in FIG. 1.

FIG. 4 shows a sectional view of the completed assembly, as noted, showing the main body housing 6, having its upper and lower blind flanges 3 and 11 connected therewith. As also shown, the manifold cage 16 is located in place, in addition to its attached manifold plate 17, supporting the filter cartridge 21. While the filter cartridge is only shown extending half way down the central cavity 24 of the housing 6, it is just as likely that a filter of greater length could be used, to expose greater filtration area therein, for cleansing of any of the high pressure gas passing through the assembly during its operations. What can further be noted, is that the high pressure gas enters the inlet 6.2.1, as noted, and it flows upwardly in the housing space 25 for entrance into the aperture 16.2, where the high pressure gas then flows downwardly, through the filter element or cartridge 21, and back into the housing cavity 24, as can be noted. Then, the cleansed gas moves upwardly for discharge out of the port 6.2.2, for delivery to whatever instrument, apparatus, or storage vessel that the cleansed gas is delivered to for further usage. Obviously, during such process, any particulate/impurity removal, and its residue, will remain within the filter cartridge 21, as processed during the filtration operation.

Variations or modifications to this subject matter of this invention may occur to those skilled in the art upon review of the invention as described herein. Such variations, if within the spirit of this invention, are intended to be encompassed within the scope of any claims to patent protection issuing herein. The description of the preferred embodiment, and the depiction of the invention in the drawings, are set forth for illustrative purposes only.

We claim:

1. A high pressure compressed air/gas/steam filter, including a series of components forming a structural filter, said structural filter having a main body housing, said main body housing having a chamber, a pair of upper and lower housing flanges threadedly secured to said main body housing, said main body housing having said chamber therethrough, a manifold assembly, said manifold assembly positioned within the main body chamber and just below its upper housing flange, said manifold assembly having a top and a bottom, a manifold plate provided sealed against the bottom of the manifold assembly, said manifold plate having an opening therethrough communicating with the manifold assembly, to allow passage of compressed air/gas/steam through said manifold assembly and said manifold plate, said manifold plate having a bottom, a filter cartridge element securing with the bottom of the manifold plate, to allow the compressed air/gas/steam to pass into said filter cartridge element for its high pressure filtration, said filter cartridge element allowing the compressed air/gas/stem to pass into the housing chamber after its filtration, said main body housing having an inlet port provided through its upper housing flange, said inlet port providing for entrance of the compressed air/gas/steam into the housing chamber, and into and through said manifold assembly, an outlet provided from the housing chamber, below the manifold plate and into the cartridge element to allow for the filtered compressed air/gas/steam to pass into the housing chamber, said main body housing having a discharge port, to allow for discharge and conveyance of the filtered air/gas/steam to another area for usage.

2. The high pressure compressed air/gas/steam filter of claim 1, and including a lifting bar secured with the top end of the manifold assembly, and to facilitate the removal of said manifold assembly, said manifold plate, and the filter cartridge element from the housing when the top flange is removed for servicing of the filter.

3. The high pressure compressed air/gas/steam filter of claim 2, wherein said manifold plate also includes a lifting member provided approximate its top surface, and to facilitate the lifting of the manifold plate from the housing during servicing.

4. The high pressure compressed air/gas/steam filter of claim 3, wherein said lifting member of the manifold plate has a threaded socket provided upon its lower surface, and furnished for accommodating the threaded engagement of a tie rod therein, when securing the filter cartridge to the manifold plate during assembly of the high pressure filter for usage.

5. The high pressure compressed air/gas/steam filter of claim 4, wherein said tie rod extends through said filter cartridge element, and a fastening means securing with the bottom of the tie rod, for securement of the filter cartridge element to the manifold plate in preparation for its usage.

6. The high pressure compressed air/gas/steam filter of claim 5, and including a series of o-rings, one provided between the upper flange and said main body housing, a second o-ring provided between the bottom flange and the bottom of the main body housing, and further o-rings securing between the filter and the manifold plate, and between the manifold plate and the cylindrical manifold cage, during their assembly for high pressure filtration.

7. The high pressure compressed air/gas/steam filter of claim 6, and said inlet port and the discharge port of the main body housing having a series of fasteners extending therefrom, and for use for securement of inlet and discharge ports connection flanges to the main body housing when assembling the filter housing for usage.

\* \* \* \* \*